L. E. UNDERWOOD.
POLE PIECE FOR DYNAMO ELECTRIC MACHINES.
APPLICATION FILED JAN. 11, 1908.

920,886.

Patented May 4, 1909.
2 SHEETS—SHEET 1.

Witnesses:
Lester H. Fulmer
J. Ellis Glen

Inventor,
Louis E. Underwood
By Albert G. Davis
Att'y.

L. E. UNDERWOOD.
POLE PIECE FOR DYNAMO ELECTRIC MACHINES.
APPLICATION FILED JAN. 11, 1908.

920,886.

Patented May 4, 1909.
2 SHEETS—SHEET 2.

Witnesses:
Lester H. Fulmer
J. Ellis Glen

Inventor
Louis E. Underwood,
By Albert G. Davis
Att'y.

UNITED STATES PATENT OFFICE.

LOUIS E. UNDERWOOD, OF LYNN, MASSACHUSETTS, ASSIGNOR TO GENERAL ELECTRIC COMPANY, A CORPORATION OF NEW YORK.

POLE-PIECE FOR DYNAMO-ELECTRIC MACHINES

No. 920,886.

Specification of Letters Patent.

Patented May 4, 1909.

Application filed January 11, 1908. Serial No. 410,380.

*To all whom it may concern:*

Be it known that I, LOUIS E. UNDERWOOD, a citizen of the United States, residing at Lynn, county of Essex, State of Massachusetts, have invented certain new and useful Improvements in Pole-Pieces for Dynamo-Electric Machines, of which the following is a specification.

My present invention relates to dynamo-electric machines, and more particularly to the construction of pole pieces therefor, and has for its object an improved construction whereby such machines are cheapened.

My invention enables me to fasten pole tips on the poles of dynamo-electric machines in a very cheap and satisfactory manner. It consists in fastening laminated tips having projecting end plates to pole pieces cast integral with the frame of the machine, the cast portions of the pole being bored out to a diameter somewhat greater than the diameter of the armature of the dynamo-electric machine. The fastening means for the tips engage the end plates and the cast portions of the pole.

My invention is particularly advantageous when applied to commutating poles, especially when such poles are very narrow making it difficult to use bolts for fastening the tips in place.

For a better understanding of my invention and the advantages possessed by it, reference may be had to the following description taken in connection with the accompanying drawing in which—

Figure 1:
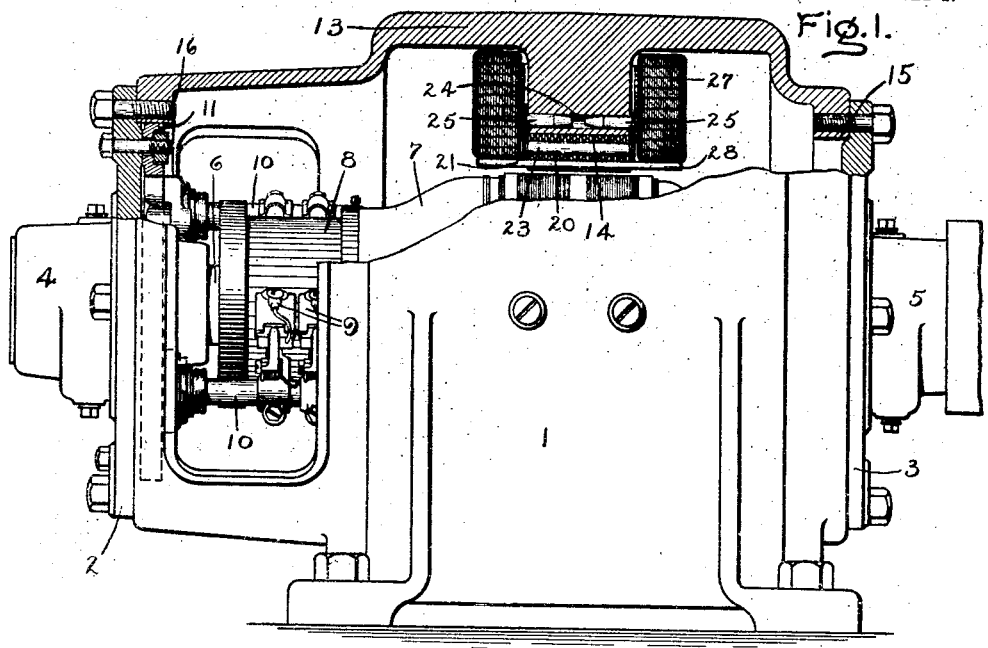
Figure 2:
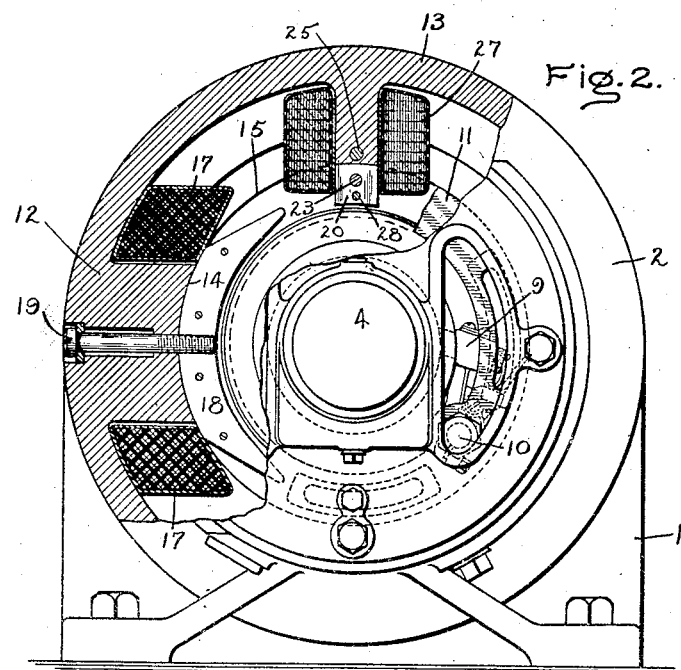
Figure 3:
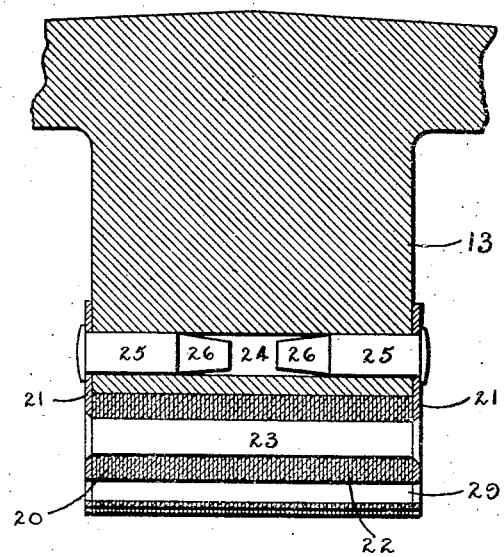
Figure 4:
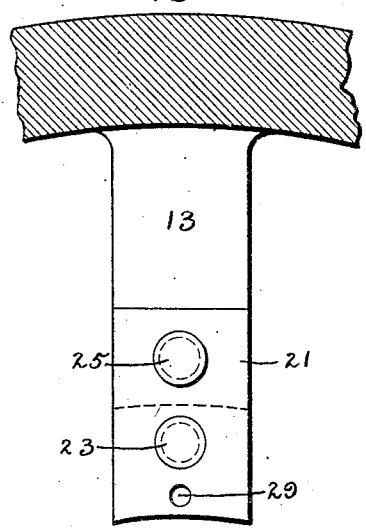

Figure 1 is a side view of a dynamo-electric machine embodying my invention, with parts broken away and in section to show the interior construction; Fig. 2 is an end view of the machine of Fig. 1, with parts broken away and in section; Fig. 3 is an enlarged section of my improved pole piece; and Fig. 4 is an end view of the same.

Referring to the drawings, 1 is the frame of the machine to which the end members 2 and 3 are fastened by means of bolts. These end members support the bearings 4 and 5 in which the armature shaft 6 is journaled. The armature 7 has a commutator 8 at one end thereof upon which brushes are caused to press. Brush-holders 9 support these brushes and are fastened to studs 10, which are suitably supported by means of a yoke 11 but are insulated therefrom in any suitable manner.

The main poles 12, as well as the commutating poles 13, are cast integral with the frame to the circumference 14 which is somewhat greater than the outside diameter of the armature 7. These surfaces of the poles are bored so as to give a finished surface, at the same time as the surfaces 15 and 16 of the frame. The main field coils 17 when placed in position may be held there by the main pole tips 18. These pole tips are fastened in place by bolts 19. The pole tips 20 of the commutating poles have end punchings 21 which may be considerably thicker than the punchings 22 which go to make up the pole tips. In each of the pole tips 20 these end punchings project a considerable distance toward the base of the pole, and a rivet 23 holds all of the punchings together. Through the projecting portions of the end punchings holes are made, and a corresponding hole 24 is drilled through the pole core 13, but at a slightly greater distance from the bored surface than the holes punched in the end plates. Two pins 25, which are partly tapered at their ends 26, are driven in the hole 24, one from each side. In this way the relative positions of the holes tend to draw the pole tip firmly into its seat. When the pins are driven home the field coil 27 may be slipped on. When the pole tip has thus been placed in position it is unnecessary thereafter to remove the same. The coil 27 is held in position by means of a pin 28 which passes through a hole 29 in the pole tip.

I have chosen to illustrate my invention in connection with a commutating pole, but it is evident to those skilled in the art that this construction may also be used with main poles. Further, I desire it to be understood that my invention is not limited to the particular construction shown and described, and I aim in the appended claims to cover all modifications which do not depart from the spirit of my invention.

What I claim as new and desire to secure by Letters Patent of the United States, is,—

1. In combination with the armature of a dynamo-electric machine, a field magnet frame having parts of the pole pieces cast integral with said frame and bored out to a diameter greater than the diameter of said armature, laminated pole tips having end plates of greater length than the other laminæ, and means engaging said end plates and said cast portions for holding said pole tips in place.

2. In a dynamo-electric machine, a pole piece consisting of a part cast integral with the frame of the machine, having a bored surface and a hole therein, and a part built up of laminations, the end laminæ of which project over said cast portion of the pole piece and have holes therein, said hole in the cast portion being at a greater distance from the bored surface than the holes in the end laminæ, and pins passing through said holes whereby said laminated portion of the pole is drawn firmly against said bored surface.

In witness whereof, I have hereunto set my hand this 6th day of January, 1908.

LOUIS E. UNDERWOOD.

Witnesses:
ALEX. F. MACDONALD,
JOHN A. MCMANUS, Jr.